June 9, 1959  E. C. DENCH  2,890,372
TRAVELING WAVE AMPLIFIERS
Filed Feb. 23, 1956
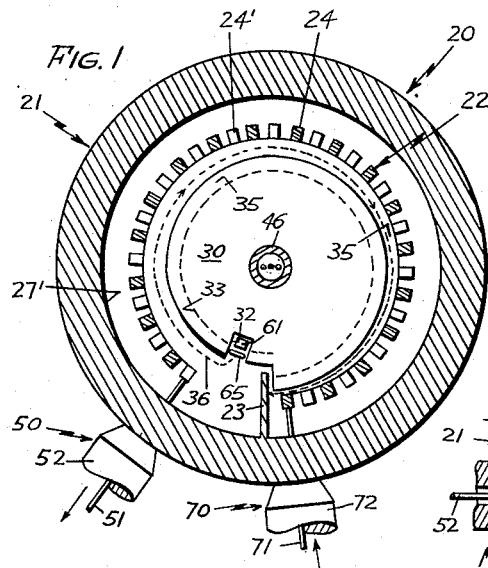
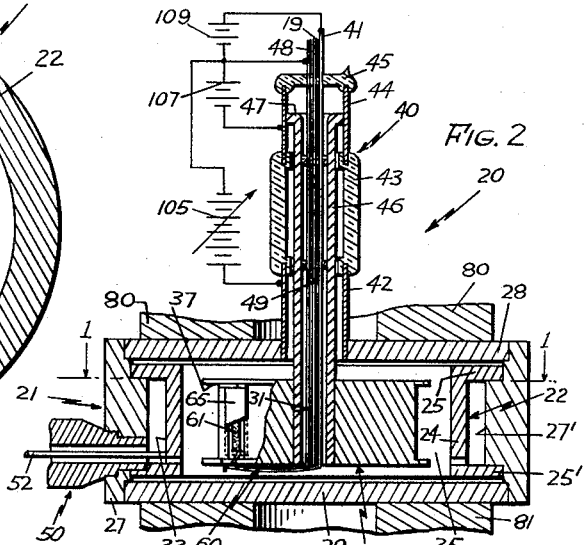
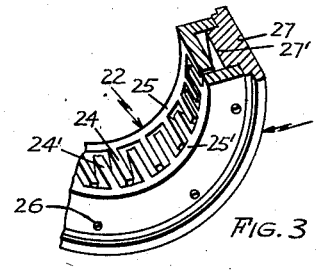
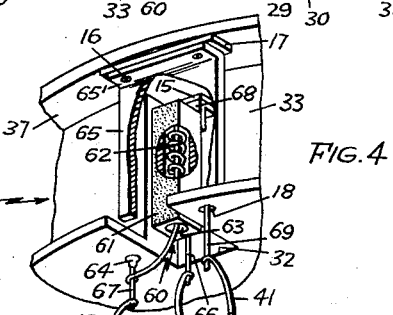
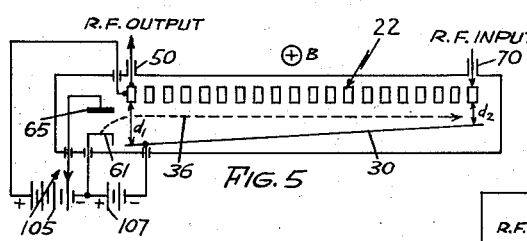
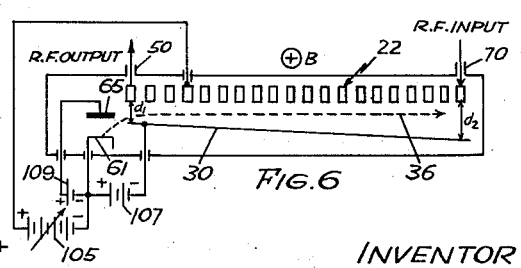
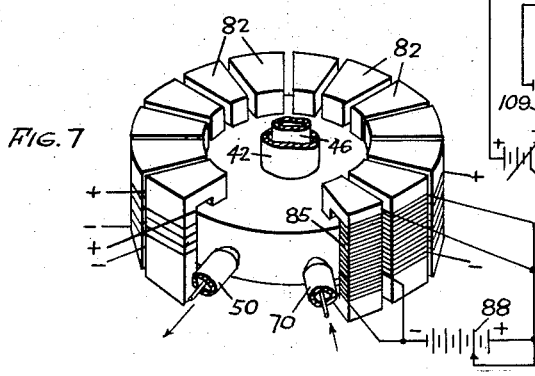
INVENTOR
EDWARD C. DENCH
BY
ATTORNEY

United States Patent Office 2,890,372
Patented June 9, 1959

2,890,372

TRAVELING WAVE AMPLIFIERS

Edward C. Dench, Needham, Mass., assignor to Raytheon Manufacturing Company, Waltham, Mass., a corporation of Delaware Application February 23, 1956, Serial No. 567,141

19 Claims. (Cl. 315—3.5)

This invention relates to a traveling wave amplifier, and, more particularly, to a tunable backward wave traveling wave amplifier capable of operation over a relatively wide frequency range.

Traveling wave amplifiers are known which include a periodic slow wave energy propagating structure, an elongated electrode spaced from and substantially co-extensive with said structure and maintained at a negative potential with respect thereto, and in cases in which the aforesaid electrode is not electron-emissive, an electron gun for producing an electron beam which travels through the interaction space between said structure and the negative electrode. A radio frequency input signal is coupled adjacent one end of the periodic structure, and owing to the interaction between the electron beam moving along a path adjacent the periodic structure and the electromagnetic field of the radio frequency wave propagating along said structure, the input signal, under the proper conditions, is amplified; this amplified signal may be extracted from said periodic structure adjacent the other end thereof.

The electromagnetic field along such a structure may be considered to consist of an infinite number of superimposed traveling waves or space harmonics, each having a phase velocity $V_p$ given by $$\frac{\omega \rho}{\Psi + 2\pi n}$$

where $\omega$ is equal to the product $2\pi$ and the frequency, $\rho$ is the pitch or length of one network section which is substantially identical for each section, $\Psi$ is the phase shift per section and $n$ is the number of the space harmonic, for example $n=0 \pm 1$, $\pm 2$, etc. The phase harmonics may be either positive or negative, depending upon the value of $n$. When $V_p$ has a positive value, the phase velocity is in the same direction as the energy or group velocity and the corresponding phase harmonics may be referred to as forward waves. On the other hand, when $V_p$ is negative, the phase velocity is in a direction opposite to the energy or group velocity and the corresponding waves then are referred to as negative space harmonics or backward waves.

If, for example, an electron beam flows in the direction of one of these backward waves at a velocity substantially equal to the phase velocity, for a given frequency, of the backward wave, interaction will take place between the beam and the traveling wave such that energy will be transferred from the electron beam to the electromagnetic field and the energy given to the backward wave will be transferred along the periodic structure in a direction opposite to that of the electron movement. If the electron beam current is below a critical current where oscillations can begin, and when the electron beam velocity is substantially equal to the velocity of one of the negative or backward space harmonics, an amplified signal may be extracted at the end of the periodic structure away from which the electron beam is being directed.

In a backward wave amplifier, the electron beam moves through mutually perpendicular electric and magnetic fields, both of which are substantially normal to the electhe electron beam.

The velocity each of the backward waves or space harmonics of a traveling radio frequency wave varies with frequency in periodic structures of the type described. The average velocity of the electron beam in tubes of the type described is dependent upon the electric field strength E and the magnetic field strength B, and is equal to the ratio $E/B$, where E is further determined by the ratio of the voltage V between the periodic structure and the negative electrode to the distance $d$ therebetween. As the velocity of the electron beam is varied, substantial synchronism may be obtained with the phase velocity of one of these harmonics and amplification may be accomplished within the traveling wave tube. Owing to the fact that tubes of the prior art are characterized by uniform beam velocity, synchronism may be obtained with the phase velocity of a given harmonic over only a comparatively narrow frequency band.

In accordance with this invention, the negative electrode of the traveling wave amplifier is inclined at an angle relative to the periodic delay structure such that the spacing $d$, instead of being constant throughout the length of the tube, gradually changes along the length thereof. As the distance $d$ changes, the electric field strength E, for a given value of B, likewise varies. The average electron beam velocity, which is proportional to the value of E, thus varies along the length of the tube, and amplification over a relatively wide band of frequencies may be achieved. The width of this band is determined by the slope of the negative electrode.

Also in accordance with this invention, the average electron beam velocity may be varied by tapering the transverse magnetic field. The transverse magnetic field may be tapered regardless of whether or not the previously described means for varying the electric field is employed.

Other objects and features of this invention will become more apparent as the description progresses, reference being made to the accompanying drawings wherein:

Fig. 1 is a cross-sectional view, taken along line 1—1 of Fig. 2, of a traveling wave amplifier according to the invention;

Fig. 2 is a sectional view of the amplifier tube illustrated in Fig. 1;

Fig. 3 is a detail view illustrating a portion of the anode assembly of the amplifier tube of Fig. 1;

Fig. 4 is a detail view illustrating the electron gun assembly of the amplifier of Figs. 1 and 2;

Fig 5 is a schematic diagram of an amplifier tube similar to that of Figs. 1 and 2 wherein a linear configuration, rather than an arcuate configuration, is used;

Fig. 6 is a schematic diagram of a modification of the linear amplifier tube shown in Fig. 5; and Fig. 7 is a view illustrating means for gradually varying the magnetic field, rather than the electrical field, of an amplifier tube such as that shown in Figs. 1 and 2.

Referring now to Figs. 1 to 4, a traveling wave tube amplifier 20 is shown which comprises an anode assembly 21 which includes a periodic slow wave energy propagating structure or anode delay line 22, an elongated electrode 30, sometimes referred to as a sole, maintained negative with respect to anode delay line 22, a lead-in assembly 40, an output coupling means 50, an electron gun mounting assembly 60 further including at least a cathode 61 and heater 62, an input coupling means 70, and a transverse magnetic field producing means 80—81, a portion of which is indicated in Fig. 2.

The anode assembly comprises a circular interdigital delay line including a plurality of interdigital fingers or members 24 and 24' which extend from oppositely disposed annular members 25 and 25' respectively. Members 25 and 25' are secured by screws 26 (see Fig. 2) to the shoulder portion of a cylindrical electrically conductive ring 27. The remainder of the anode assembly includes a pair of oppositely located cover plates 28 and 29 hermetically sealed to ring 27.

The sole 30 consists essentially of a substantially cylindrical block of material, such as copper, having a flange portion 37. A centrally located aperture 31 is provided in the sole to permit connection of lead-in assembly 40 and to allow for passage of external circuit-connecting leads in a manner to be shown subsequently. The sole may be a tubular member whose outer periphery coincides with that of the solid member illustrated in Figs. 1 to 3. The sole constructed of a solid block of material is stronger mechanically than a tubular sole and permits of more rigid mounting of the elements of the electron gun. The periphery or wall 33 of the sole is in the form of a spiral so that the spacing between the sole and the interdigital delay line gradually increases as the output end of the delay line, that is, the end of the delay line electrically adjacent the electron gun, is approached. The tapered interaction space 35 through which the electron beam 36 passes thus provides for operation of the amplifier over a wide frequency band.

Lead-in assembly 40 includes an electrically conductive cylindrical sleeve 42 which is inserted in an aperture in cover plate 28 and is securely attached thereto. A section of cylindrical glass tubing 43 interconnects metal sleeve 42 and a second metal sleeve 44. The other end of sleeve 44 is provided with a glass seal 45 for sealing tube 20 after evacuation. Sleeves 42 and 44 preferably are constructed of a material having an expansion coefficient closely approximating that of tubing 43. The assembly 40 is arranged perpendicularly to cover plate 28 of tube 20 and further includes an elongated electrically conductive tubular supporting cylinder 46 which serves as the main support for sole 30. One end of cylinder 46 is affixed to the periphery of aperture 31 in sole 30. The other end of cylinder 46 contains an outwardly flared portion 47 which is connected to the inner surface of sleeve 44. The necessary leads for the electron gun are fed through supporting cylinder 46 and are insulatedly supported therefrom by one or more glass beads 49.

The coaxial output coupling means 50 is sealed in an opening of wall 27 of the anode and is impedance matched to the anode delay line 22. The inner conductor 52 of coaxial output coupling means 50 is connected to a finger at or adjacent the end of the periodic anode delay line 22 adjacent the electron gun.

Traveling wave tube 20 may be provided with a collector electrode 23, shown in Figs. 2 and 3, for intercepting electrons after one traversal of the arcuate interaction space. This collector electrode may take the form of a projection from the back wall 27' of the anode delay line 22. In some instances, however, the collector electrode may be omitted and the electron stream made reentrant. Furthermore, the sole 30 may be either primarily or secondarily electron-emissive.

The electron gun assembly 60 for the tube of Fig. 1 includes cathode 61, heater 62, and auxiliary electrode 65, as shown in detail in Fig. 4. The cathode 61 is shown, by way of example, as a rectangular body provided with a circular bore 63 in which the heater 62 is inserted. Cathode body 61 has at least the surface facing the interaction space 35 coated with an electron-emissive material, such as a compound of barium. Cathode 61 is positioned within a recess or slot 32 in the wall 33 of sole 30. Electrical connection to the cathode is made by way of a rigid, electrically conductive stake 66 which may be made of molybdenum and spot-welded to one end of the cathode body. The cathode lead 48 is connected to stake 66. One end of heater 62 is connected to the inner wall of the cathode body while the other end of the heater is attached to a stake 67; stake 67 is insulatedly mounted by means of a bushing 64 on the top face of sole 30, as shown clearly in Fig. 4. The heater lead 19, shown in Fig. 1, is attached to stake 67.

The cathode 61 is supported by means of a flange 68 which may be secured, as by brazing, to the cathode body at one end, as shown in Fig. 4, and attached, as by insulating screws (not shown) to a portion of the sole at the bottom of slot 32. Cathode 61 is insulated from sole 30 by means of an electrically insulated spacer 15. The auxiliary electrode 65 which, in effect, is an accelerating anode serving to aid in the attainment of the desired electron beam trajectory, is supported from sole 30 by means of insulating screws 16 which pass through flange portion 65' of auxiliary electrode 65 and into flange portion 37 of sole 30. An electrically insulating spacer 17 provides for electrical isolation of the auxiliary electrode 65 and sole 30. Electrical connection is made to auxiliary electrode 65 by means of a stake 69 affixed to one end of the auxiliary electrode and electrically insulated from the sole by virtue of its passage through an aperture 18 in the sole. Lead 41 is attached to stake 69.

A suitable electric field between anode and sole may be obtained by means of a voltage applied therebetween. The sole may be negatively biased with respect to the cathode by means of a source 107 of voltage connected between cathode lead 48 and tubular sleeve 46 by way of sleeve 44. The cathode may, in some instances, be at the same potential as the sole. Similarly, anode delay line 22 may be maintained at a positive potential relative to both sole and cathode by means of a source 105 of voltage connected between metal sleeve 42, connected, in turn, to the anode delay line, and cathode lead 48. The auxiliary electrode 65 may be maintained at a positive potential relative to the cathode by means of a source 109 of voltage connected between leads 41 and 48.

A uniform magnetic field transverse to the direction of propagation of the electron beam is provided by a permanent magnet or an electromagnet having cylindrical pole pieces 80 and 81 radially positioned on or adjacent the tube. Pole piece 80 is apertured to receive the lead-in assembly 40 and pole piece 81 is apertured to maintain symmetry of the magnetic field. The flux lines should be concentrated in the interaction space 35 between sole 30 and cylindrical anode delay line 22. By proper adjustment of the magnitude and polarity of the magnetic and electric fields, the electron beam may be made to follow a circular path about interaction space 35 under the combined influence of these transversely disposed fields.

Traveling wave tube 20 further includes an input coupling assembly 70 comprising an inner conductor 71 and an outer conductor 72 coaxially arranged with respect to one another. The inner conductor 71 is connected to one of the fingers at or adjacent the end of the anode delay line 22 electrically remote from the electron gun, while the outer conductor 72 may be attached to the cylindrical wall 27 of anode assembly 21. The input coupling means 70, as well as the output coupling means 50, need not be coaxial; for example, energy may be coupled into and extracted from the anode delay line 22 by means of wave guides.

Although the traveling wave amplifier described in Figs. 1 to 4 is of arcuate construction, it should be recognized that the invention is not restricted to tubes of any particular configuration. For example, an amplifier of linear configuration may be used, as indicated schematically in Fig. 5. The elements of the tube of Fig. 5 corresponding to those of Figs. 1 to 4 are indicated by the same reference numerals. The anode delay line 22 of Fig. 5 may be an interdigital line including several interleaved fingers or elements, such as 24 and 24', as shown in Figs. 1 to 4, each of which are connected together for direct current. The anode delay line 22 of Fig. 5, as well as that of the device of Figs. 1 to 4, may be any suitable periodic slow wave propagating structure other than an interdigital line, such as a helix, a vane-type structure, or the like. In the device of Fig. 5, the elongated electrode or sole 30 is arranged coextensive with the anode delay line 22, and, like the latter, is of linear construction. The sole is inclined with respect to the anode delay line so that a tapered interaction space between anode delay line 22 and sole 30 is obtained. The spacing between the anode delay line and the sole gradually decreases from a value $d_1$ to a value $d_2$ as the input end of the anode delay line, that is, the end of the delay line electrically remote from the electron gun, is approached. The intensity E of the electric field between the sole and the anode delay line is determined by $$\frac{V_a + V_s}{d}$$

where $V_a$ is the voltage between the anode delay line and the cathode, that is, the voltage across source 105; $V_s$ is the voltage between the cathode and the sole, that is, the voltage across source 107; and $d$ is the spacing between the anode delay line and the sole at any given point. In some instances the cathode and sole may be at the same direct current potential; in this event, the electric field E between the sole and the anode delay line is determined simply by the ratio $V_a/d$.

The magnetic field B transverse to the electric field E is maintained uniform along the length of the tube, either by using a single magnet or by employing an array of magnets of identical flux density. Inasmuch as the average electron beam velocity is directly proportional to the ratio of the intensity E of the aforesaid electric field and the intensity B of the transverse magnetic field, it may be seen that the frequency band width of operation will extend from a frequence determined by the ratio $E_1/B$ to a frequency determined by the ratio $E_2/B$, where $E_1$ and $E_2$ are fixed, respectively, by the values $d_1$ and $d_2$. The width of the frequency band is determined by the amount of slope of the sole, while the mean frequency of this band is determined by the voltage between the anode delay line and the sole.

In Fig. 6, a linear backward wave amplifier 20 is shown wherein the sole 30 is inclined with respect to the anode delay line 22 so that the spacing therebetween continuously increases from a value $d_1$ at the output end of the tube to a larger value $d_2$ at the input end, as contrasted with the tube of Fig. 5, wherein the slope of the sole is of opposite sense. The frequency band width of operation will be the same in the tube of Fig. 6 as in the tube of Fig. 5. The broadband amplifiers thus far described depend upon the gradual variation of electric field intensity E with distance along the tube; however, as previously mentioned, the beam velocity of the electron is determined by the ratio $E/B$. Consequently, the spacing between the sole and the anode delay may be maintained uniform while the magnetic field strength is gradually varied along the length of the tube. Such an arrangement for a cylindrical traveling wave amplifier is indicated in Fig. 7. A transverse magnetic field thereof is provided by means of an array of closely spaced U-shaped magnets 82 circumferentially arranged about the anode assembly 21 and whose respective pole pieces 80 and 81 are in substantial alignment with the uniform interaction space, not visible in Fig. 7. The magnets are indicated as electromagnets, each having a winding 85 connected across a single unidirectional source of voltage 88 common to all of the windings. The intensity of the magnetic field associated with each magnet depends upon the number of turns of the respective winding. As shown in Fig. 7, the magnet nearest the output end of the anode delay line, that is, the magnet just to the left of output coupling number 50, is provided with the fewest number of turns. The number of coil turns on successive magnets is gradually increased along the length of the tube, and the magnet adjacent the input end of the anode delay line, that is, the magnet just to the right of the input coupling 70 in Fig. 7, carries the greatest number of turns. In this way, the flux density of each succeeding magnet is increased and a gradually increasing magnetic field is obtained as the input end of amplifier 20 is approached. The magnets may, of course, be permanent magnets rather than electromagnets, provided only that the strength of these magnets is gradually increased. The continuity of the variation of the magnetic field is determined by the number of magnets used, the spacing of the magnets, and the relative strength thereof. The midfrequency of the operating band of the amplifier may be varied by adjustment of the magnitude of the exciting voltage from source 88. The frequency band width of the amplifier of Fig. 7, like that of Fig. 5, is considerably greater than that obtainable with prior backward wave amplifiers in which both the electric and magnetic fields are uniform.

The magnetic field may be gradually altered in the opposite direction to that indicated in Fig. 7, that is to say, the magnetic field strength may be increased as the output end of the amplifier is approached.

It is further possible to gradually vary both the electric beam strength and the magnetic field strength concurrently.

This invention is not limited to the particular details of construction, materials and processes described, as many equivalents will suggest themselves to those skilled in the art. For example, although the tapered negative electrode has been shown as an auxiliary electrode or sole separate from the cathode, the negative electrode may take the form of a continuous electron-emissive cathode extending the length of the tube. Furthermore, it is not essential that the electromagnetic or magnetic field be varied continuously, so long as variations of E and B corresponding to each of the desired frequencies in the pass band are attained along the length of the amplifier tube. It is desired, accordingly, that the appended claims be given a broad interpretation commensurate with the scope of the invention within the art.

What is claimed is:

1. A wide band traveling wave electron discharge device comprising a periodic slow wave energy propagating network for transmitting electromagnetic wave energy, the pitch of said network being constant throughout a major portion thereof, means for directing a beam of electrons along a path adjacent said network in energy interacting relationship with said wave energy, said means for directing including means for producing mutually perpendicular unidirectional electric and magnetic fields in the region of said path and substantially normal thereto, input coupling means positioned adjacent the end of said network toward which electrons are directed for inserting an input signal containing at least one discrete frequency component into said device, output means disposed adjacent the end of said network away from which said electrons are directed, and means for varying the intensity of at least one of said fields along said path.

2. A wide band traveling wave electron discharge device comprising a periodic slow wave energy propagating network for transmitting electromagnetic wave energy, the pitch of said network being constant throughout a major portion thereof, means for directing a beam of electrons along a path adjacent said network in energy interacting relationship with said wave energy, said means for directing including means for producing mutually perpendicular unidirectional electric and magnetic fields in the region of said paths and substantially normal thereto, input coupling means positioned adjacent the end of said network toward which electrons are directed for inserting an input signal containing at least one discrete frequency component into said device, output means disposed adjacent the end of said network away from which said electrons are directed, and means for gradually varying the intensity of at least one of said fields along said path.

3. A wide band traveling wave electron discharge device comprising a periodic slow wave energy propagating network for transmitting electromagnetic wave energy, the pitch of said network being constant throughout a major portion thereof, means for directing a beam of electrons along a path adjacent said network in energy interacting relationship with said wave energy, said means for directing including means for producing mutually perpendicular unidirectional electric and magnetic fields in the region of said path and substantially normal thereto, input coupling means positioned adjacent the end of said network toward which electrons are directed for inserting an input signal containing at least one discrete frequency component into said device, output means disclosed adjacent the end of said network away from which said electrons are directed, and means for varying the intensity of said electric field along said path for permitting amplification of said input signal.

4. A wide band traveling wave electron discharge device comprising a periodic slow wave energy propagating network for transmitting electromagnetic wave energy, the pitch of said network being constant throughout a major portion thereof, means for directing a beam of electrons along a path adjacent said network in energy interacting relationship with said wave energy, said means for directing including means for producing mutually perpendicular unidirectional electric and magnetic fields in the region of said path and substantially normal thereto, input coupling means positioned adjacent the end of said network toward which electrons are directed for inserting an input signal containing at least one discrete frequency component into said device, output means disclosed adjacent the end of said network away from which said electrons are directed, and means for varying the intensity of said magnetic field along said path for permitting amplification of said input signal.

5. A wide band traveling wave electron discharge device comprising a periodic slow wave energy propagating network for transmitting electromagnetic wave energy, the pitch of said network being constant throughout a major portion thereof, means for directing a beam of electrons along a path adjacent said network in energy interacting relationship with a backward component of said wave energy, said means for directing including means for producing mutually perpendicular unidirectional electric and magnetic fields in the region of said path and substantially normal thereto, input coupling means positioned adjacent the end of said network toward which electrons are directed for inserting an input signal containing at least one discrete frequency component into said device, output means disclosed adjacent the end of said network away from which said electrons are directed, and means for varying the intensity of said fields along said path for permitting amplification of said input signal.

6. A wide band traveling wave electron discharge device comprising a periodic slow wave energy propagating network for transmitting electromagnetic wave energy, the pitch of said network being constant throughout a major portion thereof, means for directing a beam of electrons along a path adjacent said network in energy interacting relationship with a backward component of said wave energy, said means for directing including means for producing mutually perpendicular unidirectional electric and magnetic fields in the region of said path and substantially normal thereto, input coupling means positioned adjacent the end of said network toward which electrons are directed for inserting an input signal containing at least one discrete frequency component into said device, output means disclosed adjacent the end of said network away from which said electrons are directed, and means for increasing the intensity of said electric field along said path as said output means is approached.

7. A wide band traveling wave electron discharge device comprising a periodic slow wave energy propagating network for transmitting electromagnetic wave energy, the pitch of said network being constant throughout a major portion thereof, means for directing a beam of electrons along a path adjacent said network in energy interacting relationship with a backward component of said wave energy, said means for directing including means for producing mutually perpendicular unidirectional electric and magnetic fields in the region of said path and substantially normal thereto, input coupling means positioned adjacent the end of said network toward which electrons are directed for inserting an input signal containing at least one discrete frequency component into said device, output means disclosed adjacent the end of said network away from which said electrons are directed, and means for varying the intensity of said magnetic field along said path for permitting amplification of said input signal.

8. A wide band traveling wave electron discharge device comprising a periodic slow wave energy propagating network for transmitting electromagnetic wave energy, the pitch of said network being constant throughout a major portion thereof, means for directing a beam of electrons along a path adjacent said network in energy interacting relationship with said wave energy, said means for directing including means for producing mutually perpendicular unidirectional electric and magnetic fields in the region of said path and substantially normal thereto, said means for directing further including an electrode spaced from and substantially coextensive with said periodic network, input coupling means positioned adjacent the end of said network toward which electrons are directed for inserting an input signal containing at least one discrete frequency component into said device, output means disclosed adjacent the end of said network away from which said electrons are directed, and said electrode being inclined at an angle with respect to said network.

9. A wide band traveling wave electron discharge device comprising a periodic slow wave energy propagating network for transmitting electromagnetic wave energy, the pitch of said network being constant throughout a major portion thereof, means for directing a beam of electrons along a path adjacent said network in energy interacting relationship with a backward component of said wave energy, said means for directing including means for producing mutually perpendicular unidirectional electric and magnetic fields in the region of said path and substantially normal thereto, said means for directing further including an electrode spaced from and substantially coextensive with said periodic network, and maintained at a negative potential with respect to said network, input coupling means positioned adjacent the end of said network toward which electrons are directed for inserting an input signal containing at least one discrete frequency component into said device, output means disclosed adjacent the end of said network away from which said electrons are directed, and said electrode being inclined at an angle with respect to said network such that the spacing between said electrode and said network decreases as said output means is approached.

10. A wide band traveling wave electron discharge device comprising a periodic slow wave energy propagating network for transmitting electromagnetic wave energy, the pitch of said network being constant throughout a major portion thereof, means for directing a beam of electrons along a path adjacent said network in energy interacting relationship with said wave energy, said means for directing including means for producing mutually perpendicular unidirectional electric and magnetic fields in the region of said path and substantially normal thereto, input coupling means positioned adjacent the end of said network toward which electrons are directed for inserting an input signal containing at least one discrete frequency component into said device, output means disclosed adjacent the end of said network away from which said electrons are directed, and an array of magnets of different field strength arranged along said path.

11. A wide band traveling wave electron discharge device comprising a periodic slow wave energy propagating network for transmitting electromagnetic wave energy, the pitch of said network being constant throughout a major portion thereof, means for directing a beam of electrons along a path adjacent said network in energy interacting relationship with said wave energy, said means for directing including means for producing mutually perpendicular unidirectional electric and magnetic fields in the region of said path and substantially normal thereto, input coupling means positioned adjacent the end of said network toward which electrons are directed for inserting an input signal containing at least one discrete frequency component into said device, output means disclosed adjacent the end of said network away from which said electrons are directed, and an array of magnets of different field strength arranged along said path in the order of their respective field strengths.

12. A wide band traveling wave electron discharge device comprising a periodic slow wave energy propagating network for transmitting electromagnetic wave energy, the pitch of said network being constant throughout a major portion thereof, means for directing a beam of electrons along a path adjacent said network in energy interacting relationship with a backward component of said wave energy, said means for directing including means for producing mutually perpendicular unidirectional electric and magnetic fields in the region of said path and substantially normal thereto, input coupling means positioned adjacent the end of said network toward which electrons are directed for inserting an input signal containing at least one discrete frequency component into said device, output means disclosed adjacent the end of said network away from which said electrons are directed, and an array of magnets of different field strength arranged along said path in the order of their respective field strengths.

13. A wide band traveling wave electron discharge device comprising a periodic slow wave energy propagating network for transmitting electromagnetic wave energy, the pitch of said network being constant throughout a major portion thereof, means for directing a beam of electrons along a path adjacent said network in energy interacting relationship with said wave energy, said means for directing including means for producing mutually perpendicular unidirectional electric and magnetic fields in the region of said path and substantially normal thereto, an electrode spaced from and substantially coextensive with said periodic network, and maintained at a negative potential with respect to said network, input coupling means positioned adjacent the end of said network toward which electrons are directed for inserting an input signal containing at least one discrete frequency component into said device, output means disclosed adjacent the end of said network away from which said electrons are directed, said electrode being inclined at an angle with respect to said network, and said means for producing a magnetic field including a plurality of magnets of different field strength positioned along said path.

14. A wide band traveling wave electron discharge device comprising a periodic slow wave energy propagating network for transmitting electromagnetic wave energy, the pitch of said network being constant throughout the length thereof, means for directing a beam of electrons along a path adjacent said network in energy interacting relationship with a backward component of said wave energy, said means for directing including means for producing mutually perpendicular unidirectional electric and magnetic fields in the region of said path and substantially normal thereto, an electrode spaced from and substantially coextensive with said periodic network, and maintained at a negative potential with respect to said network, input coupling means positioned adjacent the end of said network toward which electrons are directed for inserting an input signal containing at least one discrete frequency component into said device, output means disclosed adjacent the end of said network away from which said electrons are directed, said electrode being inclined at an angle with respect to said network.

15. A wide band traveling wave electron discharge device comprising a periodic slow wave energy propagating network for transmitting electromagnetic wave energy, the pitch of said network being constant throughout a major portion thereof, means for directing a beam of electrons along a path adjacent said network in energy interacting relationship with a backward component of said wave energy, said means for directing including means for producing mutually perpendicular unidirectional electric and magnetic fields in the region of said path and substantially normal thereto, an electrode spaced from and substantially coextensive with said periodic network, said spacing being substantially uniform throughout the length of said network, and maintained at a negative potential with respect to said network, input coupling means positioned adjacent the end of said network toward which electrons are directed for inserting an input signal containing at least one discrete frequency component into said device, and output means disclosed adjacent the end of said network away from which said electrons are directed, said electrode being inclined at an angle with respect to said network, and said means for producing a magnetic field including a plurality of magnets of different field strength positioned along said path in the order of their respective field strengths.

16. A wide band traveling wave electron discharge device comprising a periodic slow wave energy propagating network for transmitting electromagnetic wave energy, the pitch of said network being constant throughout a major portion thereof, means for directing a beam of electrons along a path adjacent said network in energy interacting relationship with said wave energy, said means for directing including means for producing mutually perpendicular unidirectional electric and magnetic fields in the region of said path and substantially normal thereto, an electrode spaced from and substantially coextensive with said periodic network, and maintained at a negative potential with respect to said network, input coupling means positioned adjacent the end of said network toward which electrons are directed for inserting an input signal containing at least one discrete frequency component into said device, output means disclosed adjacent the end of said network away from which said electrons are directed, said electrode being inclined at an angle with respect to said network, and said magnetic field intensity being substantially uniform along the length of said network.

17. A wide band traveling wave electron discharge device comprising a periodic slow wave energy propagating network for transmitting electromagnetic wave energy, the pitch of said network being constant throughout a major portion thereof, means for directing a beam of electron along a path adjacent said network in energy interacting relationship with a backward component of said wave energy, said means for directing including means for producing mutually perpendicular unidirectional electric and magnetic fields in the region of said path and substantially normal thereto, an electrode spaced from and substantially coextensive with said periodic network, and maintained at a negative potential with respect to said network, input coupling means positioned adjacent the end of said network toward which electrons are directed for inserting an input signal containing at least one discrete frequency component into said device, output means disclosed adjacent the end of said network away from which said electrons are directed, said electrode being inclined at an angle with respect to said network, and said magnetic field intensity being substantially uniform along the length of said network.

18. A wide band traveling wave electron discharge device comprising a periodic slow wave energy propagating network for transmitting electromagnetic wave energy, the pitch of said network being constant throughout the length thereof, means for directing a beam of electrons along a path adjacent said network in energy interacting relationship with said wave energy, said means for directing including means for producing mutually perpendicular unidirectional electric and magnetic fields in the region of said path and substantially normal thereto, input coupling means positioned adjacent the end of said network toward which electrons are directed for inserting an input signal containing at least one discrete frequency component into said device, output means disclosed adjacent the end of said network away from which said electrons are directed, and means for varying the intensity of at least one of said fields along said path.

19. A wide band traveling wave electron discharge device comprising a periodic slow wave energy propagating network for transmitting electromagnetic wave energy, the pitch of said network being constant throughout a major portion thereof, means for directing a beam of electrons along a path adjacent said network in energy interacting relationship with a backward component of said wave energy, said means for directing including means for producing mutually perpendicular unidirectional electric and magnetic fields in the region of said path and substantially normal thereto, an electrode spaced from and substantially coextensive with said periodic nework, and maintained at a negative potential with respect to said network, input coupling means positioned adjacent the end of said network toward which electrons are directed for inserting an input signal containing at least one discrete frequency component signal into said device, output means disclosed adjacent the end of said network away from which said electrons are directed, said electrode being inclined at an angle with respect to said network, and said means for producing a magnetic field including a plurality of magnets of different field strength positioned along said path in the order of their respective field strengths.

References Cited in the file of this patent

UNITED STATES PATENTS

| 2,702,370 | Lerbs | Feb. 15, 1955 |
| 2,730,648 | Lerbs | Jan. 10, 1956 |
| 2,774,913 | Charles | Dec. 18, 1956 |
| 2,807,743 | Cioffi | Sept. 24, 1957 |

FOREIGN PATENTS

| 1,080,027 | France | May 26, 1954 |
| 699,893 | Great Britain | Nov. 18, 1953 |